UNITED STATES PATENT OFFICE.

MOSES S. JUDAH, OF CHICAGO, ILLINOIS.

COLLYRIUM.

SPECIFICATION forming part of Letters Patent No. 241,222, dated May 10, 1881.

Application filed February 15, 1881. (No specimens.)

*To all whom it may concern:*

Be it known that I, MOSES S. JUDAH, a citizen of the United States, residing at Chicago, Cook county, and State of Illinois, have invented a new and useful Composition of Matter to be Used for Eye-Water, of which the following is a specification.

My composition consists of the following ingredients combined in the proportions stated, viz: distilled water, half a gallon; pure cleaned copperas, one ounce; cream of tartar, one drachm. These ingredients are combined in the following manner: The distilled water is poured into a glass vessel of convenient size, and the copperas is then placed in the water. After it is dissolved the solution is filtered and the dregs are thrown away. In this pure solution, which I call "copperas-water," I then add one drachm of cream of tartar, which has the effect of preventing precipitation. The composition is then drawn off into small bottles, and being securely corked, is ready for use, and is to be applied to sore or inflamed eyes, preferably by means of linen cloth saturated with the solution.

What I claim, and desire to secure by Letters Patent of the United States, is—

The herein-described composition, to be used as a remedy for sore or inflamed eyes, consisting of distilled water, pure clean copperas, and cream of tartar, in the proportions specified.

MOSES S. JUDAH.

Witnesses:
A. S. TAYLOR,
S. H. JACOBSON.